Oct. 15, 1963  H. K. GILLMAN  3,106,744
APPARATUS FOR SLAUGHTERING DOMESTIC ANIMALS
Filed Nov. 4, 1960  2 Sheets—Sheet 1

INVENTOR.
Harold K. Gillman
BY
Atty.

Oct. 15, 1963  H. K. GILLMAN  3,106,744
APPARATUS FOR SLAUGHTERING DOMESTIC ANIMALS
Filed Nov. 4, 1960  2 Sheets-Sheet 2

INVENTOR.
Harold K. Gillman
BY
Atty.

United States Patent Office 3,106,744
Patented Oct. 15, 1963

3,106,744
APPARATUS FOR SLAUGHTERING DOMESTIC ANIMALS
Harold K. Gillman, Albany, N.Y., assignor to The Allbright-Nell Company, Chicago, Ill., a corporation of Illinois
Filed Nov. 4, 1960, Ser. No. 67,292
2 Claims. (Cl. 17—1)

This invention relates to apparatus for facilitating the slaughtering and subsequent processing of domestic animals such as hogs, and more particularly to automatic separating and feed gate controls for controlling the entrance of the animals onto a conveyor where they are transported into and through an immobilizing chamber.

As hogs are slaughtered in more humane accepted slaughter house practice today, the animals are conveyed or otherwise moved in a substantially continuous file through an immobilizing chamber wherein carbon dioxide or other satisfactory gas is administered under uniform control, to immobilize the animals without affecting their involuntary processes such as breathing and blood circulation prior to the sticking operation. The advantages of such practice are substantial and numerous serving to eliminate the dirty, dangerous and disagreeable task performed by shackling crews struggling and working in pens with frantic animals. Immobilization of the animals prevents tightening of the muscles during their travel along the conveyor, thereby producing fuller and faster bleeding without splattering of blood on other animals or upon the equipment used. In addition, bruising of the flesh, prevalent in former practices and even disjointing is materially reduced and with full bleeding, hams and other cuts of the finest quality are produced.

One of the problems in this practice however, lies in individual admission of the animals to the conveyor from the entrance platform and gates. In previous arrangements an operator had to handswing a gate at the entrance while another man was required to restrain hogs at the first holding area or retaining pen by use of a small drop gate. Although the first gate is intended to restrain succeeding hogs, with little effort two hogs could force their way through the gate at the same time, causing delays, bruising and much confusion.

The present invention therefore assures a uniform and continuous file or stream of animals just prior to entrance and travel through the immobilizing chamber, by spacing and separating the animals to positively prevent stampeding, crowding or piling up of the animals in their file preparatory to immobilization.

It is therefore a principal object of this invention to provide means for automatically opening a gate located between an entrance platform and an immobilization chamber when a conveyor is at a preselected position with respect to the gate, and to automatically stop the conveyor at a second preselected entrance position of the conveyor with respect to the gate for permitting entrance of an animal into a compartment individually separating animals on the conveyor, preparatory to closing the gate behind the admitted animal and again starting the conveyor.

To such ends, it is an object to provide a plurality of electrical limit switches actuated by engagement with stanchions forming hog compartments on the conveyor, and by engagement with the opening or closing gate, in combination with an operator's control panel manipulated to control electrical and fluid circuits for the gate and conveyor.

It is another object of this invention to provide a control panel manipulated by a single operator for operating a separating gate to permit only one animal at a time to enter into an entrance platform where it awaits the automatic opening of a conveyor feed gate, and to thereafter close the feed gate behind the animal by further manipulation of the control panel.

It is another object of this invention to provide electrical means triggered by the arrival of hog separating stanchions on a conveyor for opening the conveyor motor circuit to stop said conveyor at a preselected location and automatically open a feed gate, to allow the hog to enter onto said momentarily stopped conveyor.

It is another object of this invention in conjunction with the last mentioned object to provide an operator's control panel manipulated by push buttons and a selector switch for controlling electrical solenoids of an electro-fluid actuated gate cylinder having a double action piston connected at one end to the gate, for operating fluid valves to either retract or extend the piston and consequently open or close the gate.

It is another object of this invention to provide an electro-fluid operated feed gate of specially curved shape designed to separate and feed hogs smoothly as well as to nudge a reluctant animal onto a conveyor.

These and other objects and advantages of this invention will more fully appear from the following description taken in conjunction with the accompanying drawings, in which.

Figure 1:
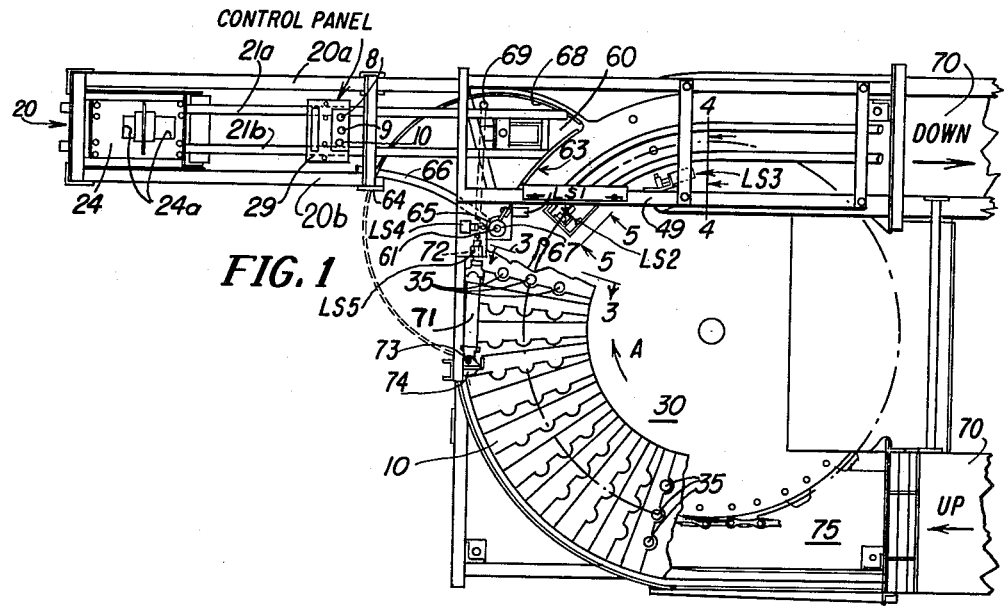
FIG. 1 is a top view of the entrance platform and enclosure apparatus incorporating the separating and feed gates for the animals preparatory to their ingress onto a conveyor for transport into an immobilizing chamber together with the control panel apparatus for controlling the operation of these gates.
Figure 2:
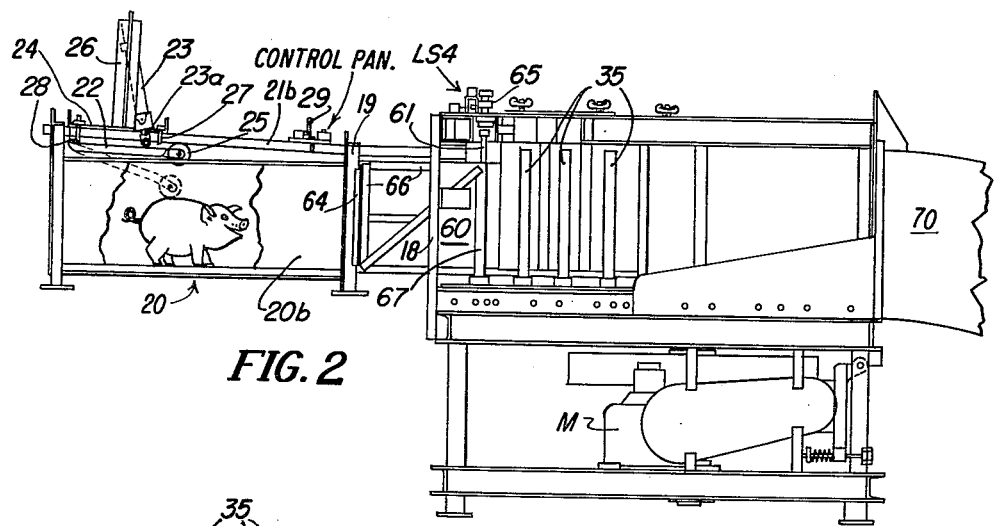
FIG. 2 is a side view of FIG. 1 partially cut away to show said platform enclosure.

In FIGS. 1 and 2 of the drawings, a preferred form of the apparatus is illustrated. Here, live animals such as hogs, are individually driven by prodders from a runway (not shown) onto a narrow entrance platform 20 through a hinged separating gate 22. On opposite sides of the platform 20, parallel walls 20a and 20b respectively, are placed sufficiently close together to prevent the animals from turning. The gate 22 preferably is hinged to swing downstream into the entrance portion of the platform and is provided with a fluid actuated cylinder 23 controlled by a lever operated valve 29 at an operator's control panel. The control panel is mounted on a pair of rails 21a and 21b enclosing the upper portion of the entrance platform, which permits the operator to view the approaching animal while manipulating the control panel. The control panel includes a selector switch utilized to control the automatic feeding of the hogs to the conveyor, or to shut off the feed circuit so that the feed gate 60 remains closed while the conveyor is operated for cleaning. In addition to the selector switch, two additional controls in the form of push buttons are provided, one to automatically open the feed gate 60, and the other to close it. The feed gate 60 is electro-fluid controlled by means of a double action fluid cylinder 71 and automatic interlocked electrical controls actuated by stanchions 35 on an endless conveyor 30 for automatically opening and closing this gate. The feed gate 60 swings on anti-friction bearings about a shaft 61, counter-clockwise for opening and clockwise for closing. Furthermore, this feed gate, is opened only when a set of stanchions 35 of the conveyor is in a preselected loading position to receive a hog and the selector switch of the control panel is in the automatic position. The gate must thereafter be closed to permit the conveyor 30 to re-start. The endless conveyor 30 extends throughout the immobilizing chamber 70, and the upright stanchions 35 mounted at spaced intervals on the conveyor 30 serve to maintain individual compartments 10 for spacing and separating the hogs as they are transported from the feed gate 60 through the immobilizing chamber. The stanchions 35 further serve to trigger limit switches LS2 and LS3 for opening the circuit for the conveyor motor M, and for unlatching and initiating the automatic opening of the feed gate 60 respectively at preselected positions of the conveyor with respect to the loading station. The immobilizing process and chamber 70 is described in U.S. Letters Patent 2,733,477, issued February 7, 1956, to L. W. Murphy, to which reference may be had and describes the manner in which hogs are immobilized or partially asphyxiated by a suitable gas such as carbon dioxide during travel through the chamber. Thereafter, the immobilized hogs are shackled at a shackling station 75 after egress from the chamber, hoisted and moved to a sticking station generally along an overhead rail, all in known manner and therefore not shown. The immobilization process and chamber 70 as described in U.S. 2,733,477 is exemplary of only one humane slaughtering technique. Other accepted humane slaughtering techniques including chambers wherein animals are electrically stunned for example or otherwise immobilized are intended to be within the scope of the present invention in which animals are segregated and fed by conveying means to an immobilizing chamber or station as best defined in the appended claims.

The hog separating gate 22 as best seen in FIG. 2 comprises a mounting plate 24 mounted atop the rails 21a and 21b by means of U-bolts 27. An upright support 26 on the plate 24 pivotally supports one end of a fluid operated double action cylinder 23, preferably pneumatic, housing a pressurized piston 23a. The air pressurized pneumatically operated piston 23a slidable within the air cylinder 23 is pivotally connected near the free end of the normally closed separating gate 22 for movement through a slot 24a (FIG. 1), in the mounting plate 24. The other end of the gate 22 is hinged at 28 to the mounting plate 24. The gate thus swings from a normally closed position to the open position shown in FIG. 2. When a hog is ready to be received, the operator at the control panel manipulates the air valve 29 in one direction to retract the air piston 23a. The separating gate 22 will thus swing to the open position permitting a hog to enter. As the hog passes through the gate the operator manipulates the air valve 29 in a second direction pressurizing the air cylinder 23 closing the gate behind the entering hog. Should the hog fail to clear the closing gate 20, an elongated rubber roller 25 connected to the free or swingable end of the gate 22 engages and rolls on the hog's back without injuring or bruising the animal. The pressure applied to the piston 23a for closing the gate 20 is sufficient however to thwart the entry of a subsequent hog until wanted. Thus, the gate 22 initially segregates a hog and prevents entry of more than one hog onto the entering platform at one time.

The feed gate 60 as viewed from the top in FIG. 1, is somewhat scimitar shaped and has three sides, one corner of which takes the form of a vertical hollow tube 67 (FIG. 2) for swingingly supporting the gate 60 on anti-friction bearings of a shaft 61 on the frame. The circumferal side 68 of the gate 60 follows a circular path from the closed position shown in FIG. 1 to an open position, the path of which is indicated in phantom line. The side 66 includes an elongated stop 64 (FIGS. 1 and 2) for overlapping engagement with an abutment or frame support 19 of the entering platform 20, to limit the clockwise movement of the gate as it is closed. The stop 64 also engages an abutment or frame support 18 to limit the counter-clockwise movement of the gate when it is opened. The side 63 is of substantially concave design adapted to engage the butt of the hog and nudge a reluctant hog onto the conveyor during the closing movement of the gate 60.

An electro-pneumatically operated cylinder 71 for swinging the feed gate 60 is pivotally connected at one end to the frame extension 74 of a frame support by means of a pivot pin 71 together with its extension is pivotally connected at its free end to the upper part of the feed gate 60 by means of a pivot pin 69. The cylinder 71 is of the double action type, viz. it is pressurized at either end for both retracting and thrusting the piston 72 to rotate the feed gate 60 in opposite directions. Two electrical solenoids 77, and 79 (FIG. 7) are included for controlling air valves (not shown) in the piped air line (also not shown), whereby when one solenoid is energized it operates one air valve to pressurize one end of the cylinder 71 for retracting the piston 72, and when the other solenoid is energized it operates another air valve to pressurize the other end of cylinder 71 for thrusting the piston 72. Consequently, air pressure applied to one end or the other of the cylinder 71 for either retracting or thrusting piston 72 will respectively open or close the feed gate 60.

Another solenoid 78 (FIG. 7), is also included for controlling air pressure to a latch (not shown) on the gate. The latch is arranged to automatically lock when the gate is closed to prevent a hog from opening the feed gate 60 after entry onto the conveyor should it attempt to return to the entrance platform. The unlatch solenoid 78 is electrically energized when a stanchion operated limit switch LS3 is actuated to close this electrical circuit preparatory to opening the gate 60, which occurs in a preselected position of the conveyor in respect to the feed gate 60 where the animal is no longer in a position to return to the entrance platform.

Although not shown, a compressed air supply is provided including compressor, accumulator, air filter, pressure regulator and automatic lubricator for the air cylinder 23 and 71. The pressure regulator permits variation in pressure for being applied to either end of cylinder 71 for accommodating different size hogs that are being fed to the conveyor. This pressure variation is not only for nudging different size hogs reluctant to enter onto the conveyor, but is also a safety feature in that the closing feed gate will not multilate a hog that for some reason or another might become wedged in the gate opening. Thus the hog's body weight will afford sufficient resistance to the applied air pressure to prevent crushing, whereupon the operator would depress the Open Gate push button to open the gate and free the hog.

The Control Panel shown in FIGS. 1 and 2 includes in addition to the air valve 29 for the separating gate 22, a two-position selector switch 8, and an Open Gate push button 9, and a Closed Gate push button 10. The first position of the selector switch 8 is for closing an automatic electrical feed circuit, and in a manually turned second position for shutting off the feed circuit to clean the platform equipment. The Open Gate push button 9 is momentarily depressed to close an electrical circuit to energize the open gate solenoid 77 actuating a valve to the air cylinder 71 to automatically open the feed gate. Likewise, the momentary depression of the Close Gate push button 10 will close an electrical circuit to energize the Close Gate solenoid to actuate another valve to cylinder 71 to close the feed gate. In the normal automatic operation, the Open Gate push button 9 is only utilized to open the gate on a wedged hog, because the feed gate 60 is initially opened when a stanchion 35 on the conveyor 30 triggers a limit switch in preselected position of the conveyor. Thus, by means of the control panel, a single operator is able to control the travel of the hogs from the runway to the conveyor 30 by manipulations of the controls.

The conveyor 30 for transporting the hogs from the feed gate 60 through the immobilizing chamber 70 may be of any well-known endless type, movable along on rollers or the like. The conveyor is driven by a motor M in conjunction with other linkage in a well-known manner. For a preferred type conveyor linkage, any of the examples described in the referenced Murphy patent will be sufficient. Although the conveyor is shown partially cut away in FIG. 1, it is to be understood that it extends throughout the immobilizer chamber 70, which is also only partially shown. As described by patentee Murphy the conveyor 30 moves in the direction of the arrow A for transporting the animals into the immobilizing chamber 70 where the chamber dips downward at the designation Down in FIG. 1, to a more suitable confinement area for the heavier than air gas such as carbon dioxide where the animals are immobilized or asphyxiated. The immobilized animals are then conveyed upwardly to the location designated Up, and out to the shackling station 75 where the animals are shackled by their hind legs to an overhead hook conveyor. The unconscious hogs, voluntary actions by which has been completely immobilized then hang, head down and are transported to a stickers platform where the carotid artery is cut.

Figure 3:
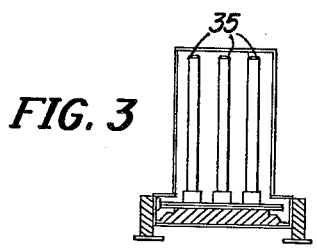
FIG. 3 is a section taken on the line 3—3 of FIG. 1, looking in the direction of the arrows and illustrating the conveyor stanchions.

Simultaneously with the advance of the animals on the conveyor 30, separation stanchions 35 as best seen in FIGS. 2 and 3, mounted at spaced intervals three abreast on the conveyor, serve to maintain individual spacing and separation between the hogs as they move along with the conveyor. These stanchions 35 further serve to trigger limit switches upon engagement during movement of the conveyor. For instance, each center stanchion as viewed from FIG. 1 engages the limit switch LS2 to open its electrical contacts controlling the electrical circuit to the conveyor motor M, consequently stopping the conveyor 30 at the entrance station whereupon a hog will enter on the stop conveyor between two sets of adjacent stanchions. Also, the innermost stanchion 35 engages the limit switch LS3 after the conveyor 30 has been restarted to close its electrical contacts to energize the unlatching solenoid of the cylinder 71, as well as to energize the opening gate solenoid for opening the feed gate 60.

Figure 4:
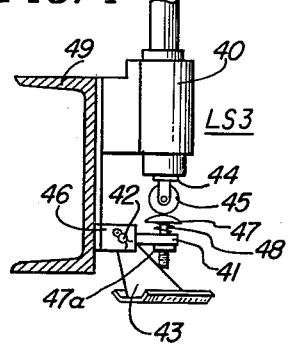
FIG. 4 is an enlarged sectional view taken along the line 4—4 of FIG. 1, showing one of the limit or micro switches in its normal unoperated position controlling the electrical circuit of the feed gate.

Referring to FIG. 4, the stanchion operated limit switch or micro switch LS3 is shown in its normal open position. This switch is mechanically operated and includes a cylinder or casing 40 of well-known design. This cylinder 40 is mounted on the rail 49 of the immobilizer entrance enclosure by welding or other fastening means. Cylinder 40 includes a piston 44 slidable therein for actuating electrical contacts not shown. A bracket 46 underlies the cylinder 40, for pivotally supporting the arm 43 by means of a pivot pin 42. Extending from the arm 43 and pivotal therewith, is a piston operating leg 41. A round headed bolt 47 extends through a hole in the leg 41 and is cushioned or tensioned in an upright position by a spring 48 encircling the bolt. The tension of the spring 48 may be adjusted by the nut 47a threadably received on the bolt. The rounded head of the bolt engages a roller 45 connected to the underside of the piston 44. The arm 43 is designed to engage the top of the innermost stanchion 35 (FIGS. 1 and 3) as it moves with the conveyor 30. Upon engagement with the stanchion 35, the arm 43 and leg 41 pivot causing the piston 44 to move upwardly to close electrical contacts C3 (FIG. 7) for controlling solenoid 78 causing the unlatching and opening of the feed gate 60 by cylinder 71. When the stanchion disengages the arm 43 upon further movement of the conveyor 30, the piston 44 will move downward and pivot the arm to its original position.

Figure 5:
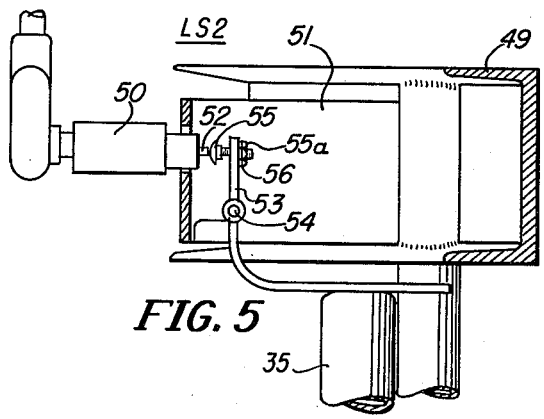
FIG. 5 is an enlarged section taken along the line 5—5 of FIG. 1, showing one of the limit switches in an operated position.

In FIG. 5, the limit switch LS2 is shown in its operated position by the center stanchion 35 of the flight conveyor. This switch, like limit switch LS3, is also mechanically operated. This switch has a support 51 also mounted on the rail 49 by welding or other fastening means. A cylinder 50 houses a slidable piston 52 for actuating electrical contacts. A substantially L-shaped arm 53 is pivotally supported on the support 51 by a pivot pin 54. On the upper portion of the arm 53 a round head bolt 55 extends into a threaded hole (not shown) for engagement with the piston 52. The bolt is held rigid within this threaded hole by a lock washer 56 and nut 55a threadedly received on the bolt and tightened against the arm. This limit switch which normally has its electrical contacts closed, is opened when the stanchion 35 engages and pivots the arm 53, to cause the round head of bolt 55 to force the piston 52 into the casing 50 to actuate contacts C2 (FIG. 6) therein. The actuation of these contacts controls a circuit to the conveyor motor M as previously mentioned. As the stanchion 35 disengages the arm 53 upon further movement of the conveyor 30, the piston 52 moves outward to pivot the arm to its normal position.

In view of the above described operations regarding limit switches LS2 and LS3, it is not felt necessary to show or describe the structure of the limit switches LS1, LS4 and LS5 since they are similar. These latter limit switches are actuated by the feed gate 60 however rather than by the stanchions. For instance, the limit switch LS1 mounted on a frame adjacent the feed gate 60 as seen in FIG. 1, is actuated by engagement with the closing gate 60. Upon actuation, the normally open contacts of this switch closes an electrical circuit to the conveyor motor M, (FIG. 6) to start the conveyor 30. This last operation occurs after the hog has entered onto the conveyor 30 and the Close Gate push button 10 has been depressed by the operator.

The limit switch LS4 is also mounted on a frame adjacent the feed gate 60 as seen in FIGS. 1 and 2. A cam 65 as seen in FIG. 1 pivots about the shaft 61 with the feed gate 60, and actuates the limit switch LS4 only when the feed gate is opened in a counter-clockwise direction to its fullest extent. This operation occurs when the feed gate 60 has been automatically opened preparatory to receipt of a hog onto the conveyor 30. The actuation of limit switch LS4 will open its normally closed contacts to open an electrical circuit controlling the energization of the open gate solenoid of cylinder 71.

The limit switch LS5 is also mounted on a frame adjacent the feed gate as seen in FIG. 1 and is actuated by engagement with the gate 60 when the gate is opened to its fullest extent. The actuation of limit switch LS5 closes its normally open contacts to prepare an electrical circuit controlling the close gate solenoid of cylinder 71 preparatory to depressing the Close Gate push button 10.

A complete operation will now be described in conjunction with the circuitry shown in FIGS. 6 and 7.

Figure 6:
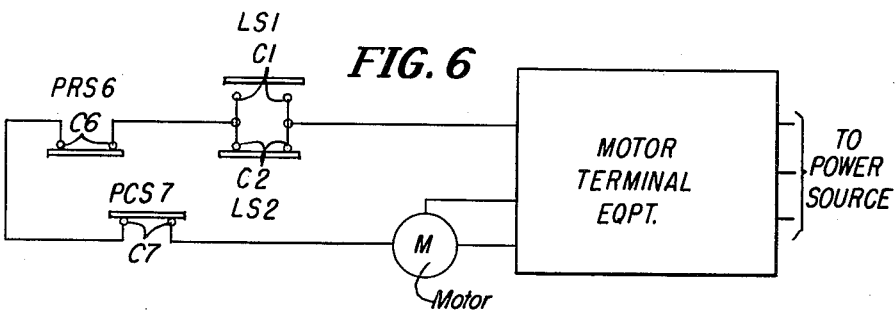
FIG. 6 is a circuit for the conveyor motor and controls.

To start the conveyor motor M shown in FIG. 6, a push rod switch PRS6 usually located at the shackling station 75 and a pull cord switch PCS7 located above the control panel must be actuated to close this electrical circuit. As shown, the circuit extends from the negative side of a power source via the terminal motor equipment, motor M, contacts C7, C6, the normally closed contacts C2 of limit switch LS2 to the positive side of the power source. Motor M through linkage in a well-known manner drives the conveyor 30. As the conveyor 30 is moved, the first center stanchion 35 to approach and engage the limit switch LS2 actuates this switch to open contacts C2 and consequently the circuit for operating motor M. However, should the feed gate 60 be closed at this time the limit switch LS1 would be actuated as previously described and consequently, contacts C1 would be closed to provide an alternate operating circuit for motor M. On the other hand, should the feed gate 60 be open, contacts C1 would be open and consequently, the opening of contacts C2 would open the circuit to motor M to thus stop the conveyor 30.

Assuming first that the feed gate 60 is closed at the time the conveyor is started, the actuation of limit switch LS2 by the moving center stanchion 35 will have no effect on the conveyor motor M. Thus, the conveyor 30 will continue to move, and shortly thereafter the innermost stanchion 35 of the same stanchion set will engage and actuate limit switch LS3.

Figure 7:
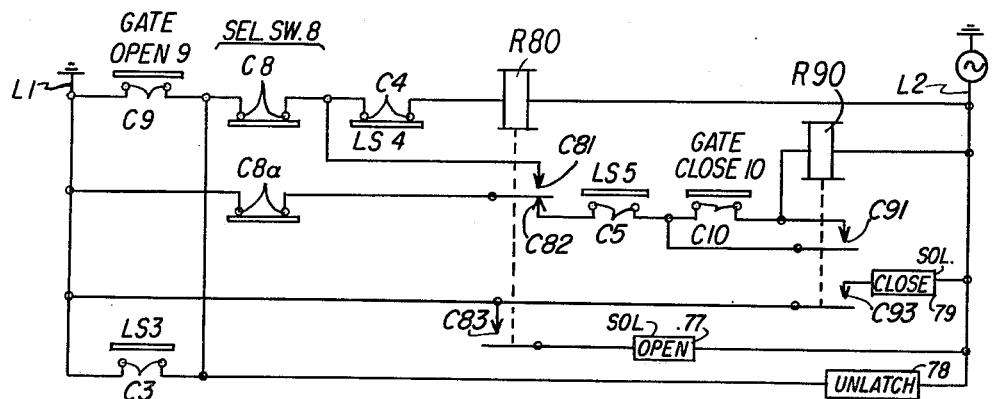
FIG. 7 is a circuit for controlling the operation of the feed gate.

Turning to the feed gate circuit shown in FIG. 7, in order for automatically feeding the hogs to the conveyor, selector switch 8 must be manually turned to "automatic feed" in which position contacts C8 and C8a are closed. Thus, when the above mentioned limit switch LS3 is actuated by the stanchion, contacts C3 close an electrical circuit to the unlatch solenoid 78 controlling cylinder 71. The unlatch solenoid 78 will thus energize to unlatch the feed gate 60 as described earlier. Also, a circuit is closed to energize relay R80 via the negative power line L1, contacts C3, C8 the normally closed contacts C4 of limit switch LS4, the winding of relay R80 to the positive power line L2. Upon energization, relay R80 closes contact C81 and C83 to respectively close a holding circuit for relay R80 via contacts C81, and closes a circuit to energize the Open Gate solenoid 77 for operating a valve to pressurize cylinder 71. Thus, the Open Gate solenoid upon energization affects the air pressure in cylinder 71 to retract its piston and open the feed gate 60. Although the actuation of limit switch LS3 is only momentary since the stanchion will disengage this switch as it moves past, the time is sufficient to permit relay R80 to lock operated through C8a and C4 and to affect the energization of the open gate solenoid 77. Thus contacts C3 will open the unlatching circuit, but not before the Open Gate solenoid 77 has already effected the opening of the feed gate 60.

When the feed gate 60 has opened completely, limit switches LS4 and LS5 will be actuated as previously described. At this point, limit switch LS4 will open its contacts C4 to open the circuit to and consequently deenergize relay R80. The actuation of limit switch LS5 and the deenergization of relay R80 will prepare a circuit to relay R90 by respectively closing contacts C5 and C82.

Returning to the alternative situation where the feed gate 60 is open at the time the conveyor 30 is started, the limit switch LS1 will have its contacts C1 open and when the moving stanchion actuates limit switch LS2, the motor circuit is opened to stop the conveyor as described.

Thus, in both of the above situations, as the conveyor 30 stops, a hog will be fed through the opened feed gate 60 onto the conveyor 30. As the hog passes through the gate, the operator at the control panel will momentarily depress the Gate Close push button 10 to close a circuit to energize relay R90 via negative line L1, contacts C8a, C82, C5, C10 and the winding of relay R90 to the positive line L2. Upon energization, relay R90 will close contacts C91 and C93 to respectively close an obvious alternate holding circuit for relay R90 when the push button is released, and an obvious circuit to energize the Close Gate solenoid 79 of cylinder 71. Upon energization, the Close Gate solenoid 79 operates an air valve to supply air pressure at one end of cylinder 71 to close the feed gate 60 as previously described. The closing of feed gate 60 actuates limit switch LS1 to close contacts C1 to restart the motor M. Thus, the cycle will be repeated.

In the event that a hog should for any reason become obstructed or held by the closing gate 60, the Gate Open push button 9 is momentarily depressed by the operator to close a circuit to relay R80 via negative line L1, contacts C9, C8, C4 and the winding of relay R80 to the positive line L2. Relay R80 will thus close a circuit to the open gate solenoid 77 as previously described to open the feed gate 60. As soon as the hog is freed, the Gate Close push button will be depressed to close the gate behind the hog.

To stop the automatic feed, selector switch 8 is manually moved to the "open" position opening contacts C8 and C8a. In this "open" position neither the stanchions nor accidental depression of the push buttons will affect the operation of the feed gate 60. Thus, the entrance platform can be cleaned.

From the foregoing description, it will be seen that a feed gate operated in synchronism with a conveyor provides a fast and efficient manner for guiding hogs individually spaced intermittently to an immobilizing chamber under the direct supervision and control of a single operator.

It will be understood that various changes in the form, details, arrangement and proportions of the different parts of the apparatus will be suggested to those skilled in the art and all such changes as may be made without departure from the spirit of the present invention are intended to fall within its scope as best defined in the appended claims.

What is claimed is:

1. Apparatus for immobilizing animals preparatory to slaughtering comprising means defining an entrance platform, an immobilizing chamber, a gate between said platform and said chamber, a conveyor provided with a plurality of stanchions forming compartments to accommodate individual animals for transportation from said gate through said chamber, means for opening and closing said gate, means for moving said conveyor, a first switch engagably actuated by a leading stanchion at a preselected position of said conveyor with respect to said gate for operating said means for opening said gate, second and third switches for stopping said means for moving said conveyor, said second switch actuated by said gate and said third switch actuated by an adjacent trailing stanchion at a second preselected position of said conveyor with respect to said gate, said second and third switches being connected in a parallel circuit with respect to each other so that both the opening of said gate and actuation by a stanchion of said third switch are required to stop the said conveyor, whereby adjacent stanchions will be positioned for entry therebetween by an animal when said gate is completely opened with said trailing stanchion in close proximity to said gate, and means for closing said gate behind the animal to start said conveyor.

2. Apparatus for immobilizing animals as claimed in claim 1 including a second gate at the inlet to said entrance platform, control means for opening and closing said second gate to permit entrance of one animal onto said platform when the gate is opened and to thwart the entrance of a subsequent animal upon closing said second gate behind said one animal.

References Cited in the file of this patent

UNITED STATES PATENTS 2,733,477    Murphy  ---------------- Feb. 7, 1956

FOREIGN PATENTS 79,947    Denmark  -------------- Oct. 3, 1955
764,138    Great Britain  ---------- Dec. 19, 1956